May 24, 1960 L. V. BJONG ET AL 2,937,518
BALL BEARING TESTING DEVICE
Filed Sept. 7, 1955 4 Sheets-Sheet 1

INVENTOR
LEO V. BJONG
CHARLES F. SCHAFER
JEROME S. HOCHHEISER
Herbert Smith
ATTORNEY May 24, 1960

L. V. BJONG ET AL 2,937,518

BALL BEARING TESTING DEVICE

Filed Sept. 7, 1955

INVENTOR
LEO V. BJONG
CHARLES F. SCHAFER
JEROME S. HOCHHEISER

ATTORNEY

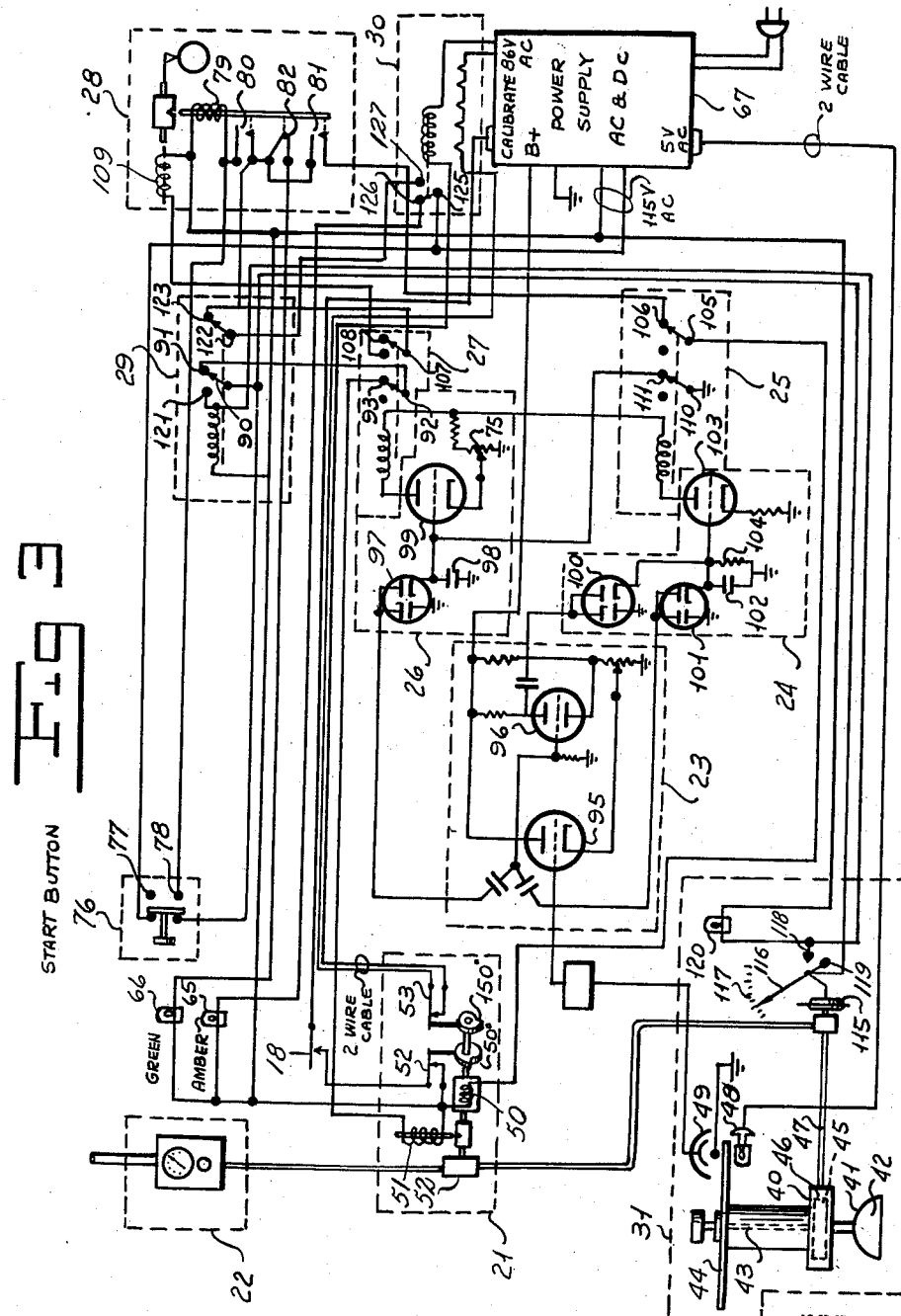

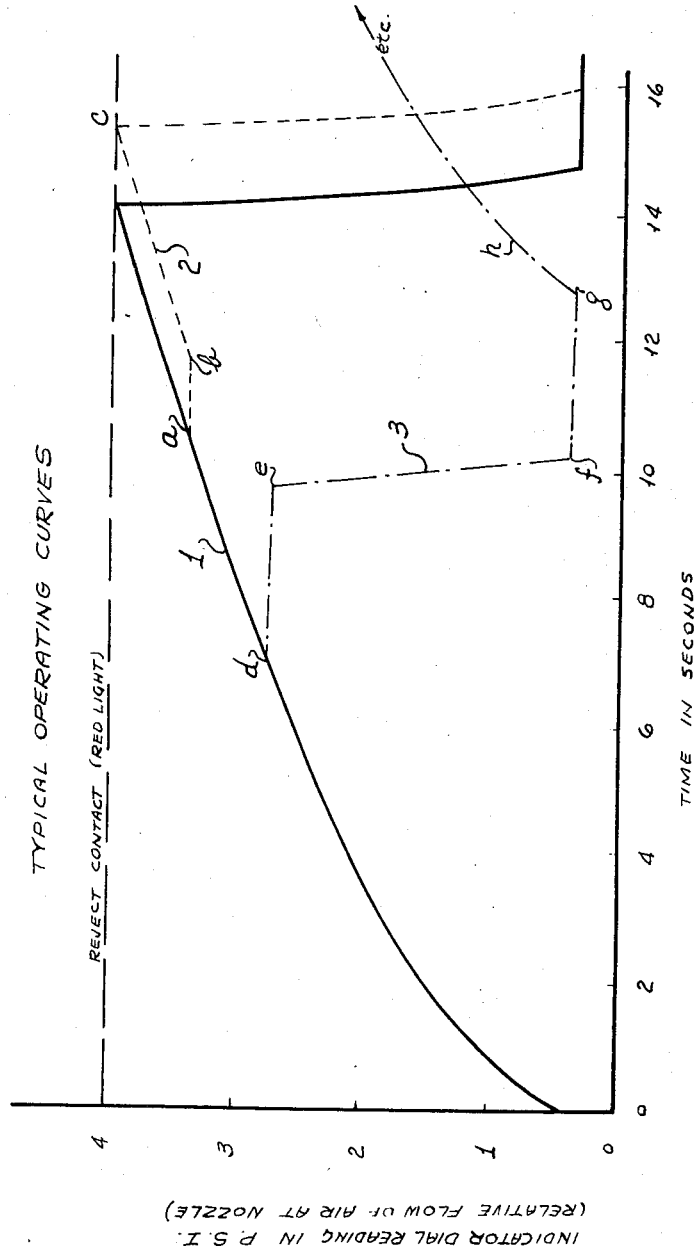

United States Patent Office 2,937,518
Patented May 24, 1960

2,937,518
BALL BEARING TESTING DEVICE

Leo V. Bjong, West Englewood, N.J., Charles F. Schafer, Glen Rock, N.J., and Jerome S. Hochheiser, Hasbrouck Heights, N.J., assignors to Bendix Aviation Corporation, Teterboro, N.J., a corporation of Delaware Filed Sept. 7, 1955, Ser. No. 532,874

15 Claims. (Cl. 73—9)

This invention pertains to bearing torque testing apparatus and more particularly to precision ball bearing torque testing apparatus which is automatic.

Requirements for ball bearing torque testing apparatus may vary quite widely depending upon the particular function of the instrument or device and where or how the bearings are to be used. The bearings may be required, for example, to support components or parts which must react very sensitively to a relatively small rotation force. Therefore, under some conditions the bearing torque may be very critical and the bearing torque may need to be as uniformly low as possible in order to obtain the necessary accuracy and response in the instrument. Further, some bearings may operate very close to zero revolutions per minute, or may possibly vary though only a few degrees. Since many of the devices on which bearings are used have critical starting torque, the method of testing is extremely important.

It is an object of the present invention to provide a bearing torque testing device which utilizes novel means of measuring the starting or "breakaway" friction of the bearing.

A further object is to provide a novel bearing tester employing novel electronic circuitry for precision automatic control of said testing.

Another object is to provide novel electro-mechanical and electronic means in a novel device for testing the bearing torque of bearing assemblies.

A further object of the invention is to provide a novel motorized valve assembly which is automatically operated for testing the torque of bearing assemblies.

A further object is to provide novel ball bearing torque testing equipment for testing the starting torque of a bearing for a predetermined number of times and indicating the results of the test.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

Fig. 3 is a representative schematic diagram showing the circuits and apparatus in detail represented by the blocks in Fig. 2.

Fig. 5 is a view showing typical operating curves of the automatic ball bearing torque tester.

Figures 1, 4:
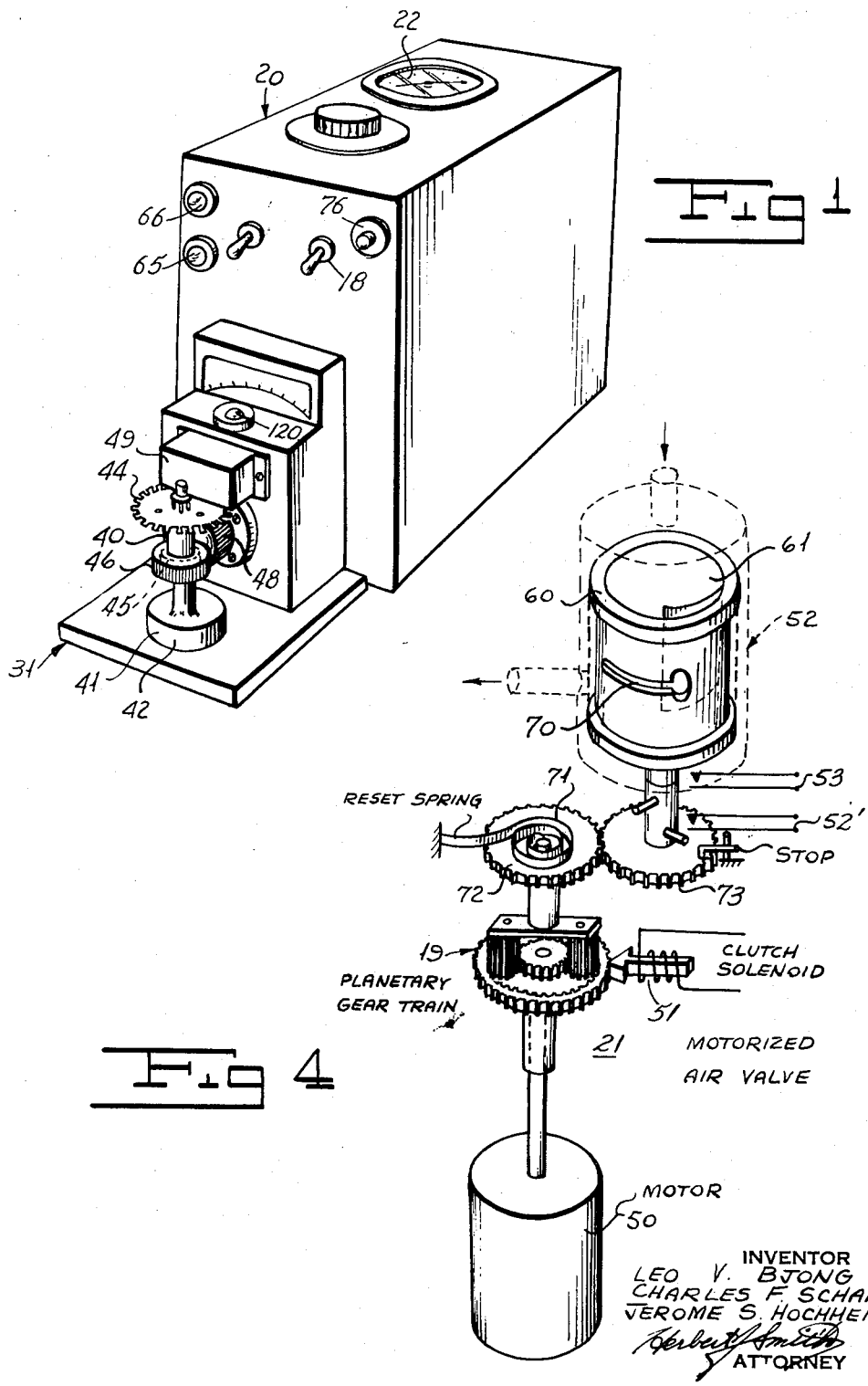
Fig. 1 is a perspective view of an automatic bearing torque tester constructed according to the invention.
Fig. 4 is a schematic drawing of the motorized air valve shown in block 21 of Figs. 2 and 3.
Figure 2:
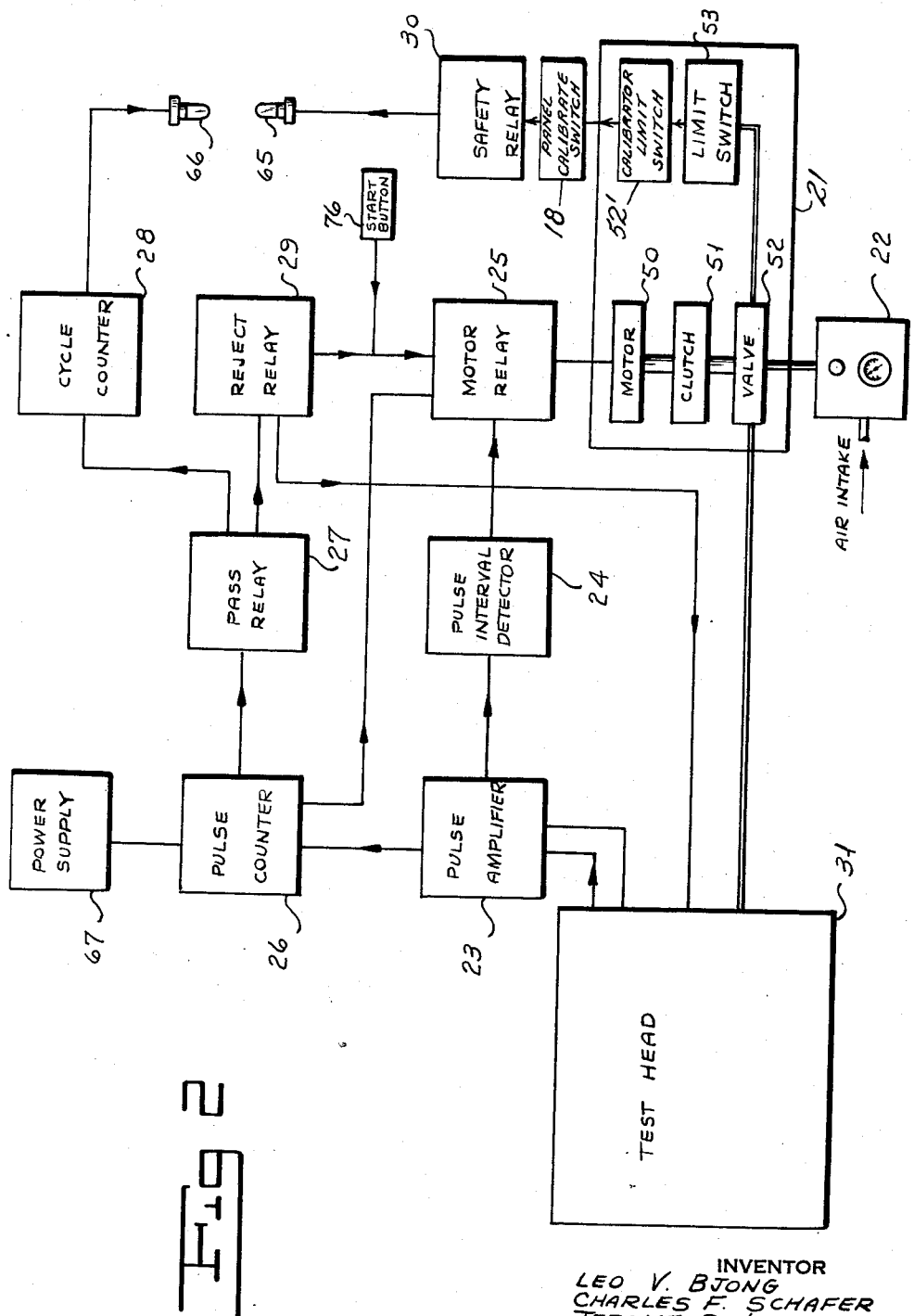
Fig. 2 is a block diagram of the tester.

Referring to the drawings and more particularly to Figs. 1, 2 and 3, there is shown an automatic ball bearing torque tester 20, which has a test head 31 for generating the signal and controlling operation of the device for testing a ball bearing assembly. The ball bearing assembly generally referred to herein is of the type which has an inner race and an outer race spaced therefrom with a plurality of balls intermediate the inner and outer races. In testing the ball bearing assembly, the method employed herein for measuring the starting or "breakaway" friction is by employing a control jet of air which engages a section of the periphery of a rotor on which a scanning disc is carried and in which the bearing under test is mounted. During this test, it is intended by the procedures to seek out a position of the bearing at which the maximum restraint to start of rotation is observed.

The equipment of the present device accomplishes the complete test automatically to indicate whether or not the bearing is good. If the bearing is good at the completion of the test, a green light is indicated; and if the bearing is a reject, a red light is shown. An amber light indicates low air pressure or an open filament circuit in the electron tubes. The machine is entirely automatic and the only requirement of an operator of the device is to load and unload the bearings.

The testing apparatus as shown in the present invention requires a source of air pressure which is connected through a pressure regulator 22 and a motorized air valve 21 to the nozzle 47 of a test head 31 for rotating a bearing test rotor 40 mounted on a bearing 45 under test supported on a mandrel 41 having a base 42 and a spindle 43. A scanning disc 44 is secured to the top of the bearing test rotor. The bearing 45 under test, shown dotted, has the interior race supported on a shoulder of the base 42, with the bearing test rotor 40 supported on the outer race. A plurality of vertical grooves 46 formed in the rotor around the peripheral edge thereof provide serrations or buckets, so that when the air stream is directed from nozzle 47 against the buckets of the rotor, the rotor and scanning disc 44 rotate and the scanning disc interrupts a light beam from an exciter lamp 48 directed onto a photoelectric tube 49. The motorized air valve 21 includes a motor 50, a clutch 51, a valve 52, a limit switch 53, and a calibrator limit switch 52'.

The motorized air valve assembly is shown in detail in Fig. 4 and is a mechanism by which the flow of air to the bearing test rotor is controlled. The special air valve 52 of the motorized valve assembly is assembled to the motor unit and both are encased in a dust cover or housing to complete the air valve unit. The valve lining 60 and stem 61 are machined so that a larger increment of air per degree rotation is passed toward the initial opening interval of the valve and a smaller increment is passed toward the latter interval opening of the valve. The normal range of the valve is through 50 degrees of rotation, and limit switch 53 is set at approximately 150 degrees and is used to energize a low pressure warning system. Cutoff or calibrator switch 52' set at 50 degrees is used to stop the valve at its proper opening for calibration.

The stem 61 of the valve as shown in Fig. 4 is drivably connected through suitable gearing and clutch 51 to motor 50, with the 50 degree and 150 degree switches 52' and 53, respectively, shown in Fig. 3 diagrammatically represented by the two radial pins shown on the lower portion of the valve stem 61. The electric control of the motor 50, the clutch 51, and the two switches which operate in conjunction with the valve stem will be described in conjunction with the operation of the device.

A pulse amplifier 23 receives a signal from the photoelectric tube 49 as the scanning disc 44 is rotated to interrupt the light from the exciter lamp 48. The pulse amplifier 23 is connected to a pulse interval detector 24, the motor relay 25 and the motorized air valve 21.

The pulse amplifier 23 is also connected with pulse counter 26, a pass relay 27, a cycle counter 28 and a green light 66. A reject relay 29 is also connected between the pass relay 27 and the motor relay 25. Further, the motor relay 25 has a count-washout circuit connected to the pulse counter 26.

The diagram blocks shown in Figs. 2 and 3 carry like reference numerals for like parts. A power supply 67 supplies the alternating current and direct current for the complete operation of the automatic ball bearing torque tester and is shown connected to the device via block 26.

The schematic wiring diagram shown in Fig. 3 is a simplified schematic diagram for the purpose of this application. However, it is to be understood that the schematic diagram of the device as manufactured would be rather complex, and that resistors, capacitors, switch elements and other details would be included for precision operation of the various electronic circuits.

As shown in Fig. 4, which is merely symbolic of the device, the valve 52 has the stem 61 which is within the lining 60, said lining containing a slot 70 which is so machined that when used in conjunction with the stem 61 which is also shaped to provide progressively varying amounts of air, depending on the relative angular displacement between said lining and said stem, the flow of air and the turning on and off thereof by the valve is automatically controlled for the purpose of testing the bearing.

At the completion of a test cycle, the reset springs 71 through gears 72 and 73 return the angular displacement of the stem relative to the lining to the starting position. A housing surrounds the lining 60 and stem 61 of the valve forming an air jacket.

In operation, the motor 50 drives the shaft. When the clutch 51 engages the planetary gears 19, the shaft from the motor drives the valve stem 61. When the clutch 51 is released, the reset spring 71 returns the valve stem 61 to starting position. This complete operation happens for each test cycle. There are several test cycles for a complete testing of each ball bearing to be tested. The number of cycles is determined by the setting of the count potentiometer 75 shown in Fig. 3 in the pulse counter 26.

After the test head has been set up to receive a ball bearing assembly which is to be tested, a start button 76 is momentarily pressed, so that it is moved from the position shown in Fig. 3 to close a circuit between the contacts 77 and 78. Upon said momentary closure of contacts 77 and 78, the cycle counter 28 having clutch 79 is engaged by energization of the windings of said clutch 79, whereupon contact set 80 closes, holding this clutch 79 engaged for the remainder of the test. As long as the winding of the clutch 79 is energized, the contact sets 80 and 81 are closed and the contact set at 82 is opened. Upon the energization of the winding of clutch 79, the counter is set and is ready to count when a proper signal impulse is received.

The closing of contact set 81 applies voltage to the motor 50 of the motorized valve unit. The motorized air valve clutch 51 being energized through the restored start button, through the contacts 90 and 91 of the reject relay 29, and through contacts 92 and 93 of the pass relay 27, the valve stem 61 starts to rotate to let in controlled air to the nozzle. The rotating valve stem allows air to flow through the nozzle 47 impinging upon the buckets 46 of the rotor. The air stream of the nozzle exerts a torque transmitted through the rotor to the bearing. When this torque is sufficient to overcome the friction of the bearing, the rotor starts to turn. This is the "break-away" friction of the bearing.

In order to determine that the bearing has started and will continue to turn, the bearing is required to rotate through a predetermined portion of a revolution. This rotation is determined in the following manner: the notches in the scanning disc cause light from the excitation lamp 48 to the photo tube to be interrupted; these interruptions generate electrical pulses to be impressed upon the grid of the tube 95 of the pulse amplifier 23 which amplifies the pulses. Aa this point two things happen: the pulses are impressed upon the pulse counter 26; and the pulses are applied to the pulse interval detector 24. The pulses applied to the pulse interval detector 24 come from both tube 95 and tube 96, tube 96 inverting the pulses for greater rotation sensitivity of the bearing. The pulses applied to the pulse counter 26 pass through the damping diode tube 97, charging up capacitor 98 which is connected to the grid of control tube 99. Successive pulses applied through tube 97 charge up condenser 98 to a point at which tube 99 will conduct sufficient current to energize the winding of the pass relay 27. The extent to which the capacitor 98 must charge in order to energize relay 27 is determined by the setting of the count potentiometer 75 in the pulse counter circuit.

The pulses applied to the pulse interval detector 24 pass through damping diodes 100 and 101, and charge condenser 102. The first pulse received by condenser 102 is sufficient charge to cause control tube 103 to become conductive and energize motor relay 25. However, successive pulses must be received in order to cause tube 103 to continue to conduct, or else the charge on condenser 102 will drain off through resistor 104 to ground. These successive pulses must be received by condenser 102 at intervals not to exceed the designed time delay in the R-C circuit 104 and 102.

In the test of a bearing that turns out to be good, the pulse interval detector will energize the motor relay 25, opening the contacts 105 and 106 thereof, thus causing the motor 50 of the motorized air valve to become de-energized, thereby holding the air flow constant, while the predetermined rotation of the bearing is taking place. While the bearing is rotating, pulses are being counted by the pulse counter until the predetermined rotation takes place. At that time pass relay 27 is energized opening contacts 92 and 93 and closing contacts 107 and 108. Winding 109 of the cycle counter 28 receives a pulse when contacts 107 and 108 close. The opening of contacts 92 and 93 of relay 27 de-energizes clutch 51 of the motorized air valve 21. The reset spring 71 (Fig. 4) in the motorized air valve is now permitted to return the valve stem 61 to its starting position. Return of the valve stem to its starting position cuts off the air flow to the nozzle 47, thereby removing the torque applied to the bearing so that the bearing may coast to a stop. When the bearing has stopped, pulses cease to be applied to the pulse interval detector. This de-energizes relay 25 closing contacts 105 and 106 and contacts 110 and 111. Closing contacts 110 and 111 discharges condenser 98. Closing contacts 105 and 106 again applies voltage to the motor 50. Discharging condenser 98 de-energizes the pass relay 27 which re-applies voltage to air valve clutch 51 due to the closure of contacts 92 and 93 of the pass relay 27, thereby starting the next test cycle in the series of cycles for testing one ball bearing assembly.

If the bearing under test completes a sufficient number of good cycles as determined by the setting of the cycle counter 28, the cycle counter upon receipt of the last pulse applied to winding 109 will automatically release its clutch mechanism 79. Releasing clutch 79 opens contact sets 80 and 81 and closes the contact set 82. The opening of contact set 80 removes the voltage from the winding of clutch 79 and opening the contact set 81 removes voltage from the motor 50 of the motorized air valve 21. Closing the contact set 82 applies voltage to energize the green light on the test panel, thereby indicating that the predetermined test requirements for the bearing under test have been successfully completed.

In the event that the bearing proves to be a reject, the following will happen: the bearing not meeting the breakaway friction requirements, will not rotate when the flow of air from nozzle 47 is applied, as described above. Consequently no signal pulse will be applied in subsequent circuits. The air pressure will continue to build up due to rotation of the stem 61 of the motorized air valve. The pressure sensitive diaphragm 115 will expand causing the needle 116 to move across the scale 117 until it reaches the reject point at a predetermined pressure. At the reject point, contacts 118 and 119 close to energize the reject relay 29 and cause the red light 120 on the test head to be energized. The energization of the reject relay 29 causes contacts 90 and 91 to open thereby de-energizing the motorized air valve clutch 51. Contacts 90 and 121 of relay 29 will close thereby holding relay 29 energized and causing the red light to continue to burn. Also, contacts 122 and 123 of relay 29 will open, thereby de-energizing the cycle counter 28 and preventing the green light from energizing. (It is to be understood that while a bearing under test may have several good cycles, it may have one reject cycle before the number of good cycles are completed.) The instant the reject becomes evident, then all the circuits will be restored to a starting position.

For the sake of self contained fault indications, in the event that one of the filaments of electron tubes 97, 99, 95, 96, 100, 101 and 103 burn out, the circuit from the filament voltage supply will be opened thereby de-energizing safety relay 30, causing contacts 125 and 126 to close. Closing of contacts 125 and 126 energizes the amber light. At the same time contacts 125 and 127 will open, thereby returning circuit conditions to the starting point. Relay 30 is energized when the voltage is applied thereto from the filament supply. All relays are shown schematically in a deenergized condition.

If for some reason the air pressure on the air supply line should fail, the motorized valve would continue to turn until the limit switch 53 opens. This will deenergize the safety relay 30 causing the amber light to energize as described above.

For calibration of the desired maximum starting torque for a given bearing test, the panel calibrate switch 18 is placed in the calibrate position. This will apply voltage to the motorized air valve motor 50 through the calibrate interlock contacts 52'. When these contacts open at approximately 50 degrees of valve stem rotation, the voltage circuit to the motor opens. However, voltage is applied and maintained on the motorized air valve clutch 51. This will permit manipulation of the calibrate valve and the air pressure regulator valve to establish the desired maximum starting torque conditions. Returning the calibrate switch to the normal position restores the set to normal operation.

In normal operation when the stem port is passed, the air flow will increase at a rate approximating curve 1 seen in Fig. 5. As curve 1 illustrates, when air flow reaches the reject point of 4 p.s.i., the air flow will be cut off and restored to a starting rate of flow which will be some small amount between zero and .5 p.s.i. To illustrate the flow of air with a rejected bearing, follow curve 1 until at point a, assuming that the bearing starts rotating at point a, air flow will be held constant. However, assuming that the bearing "hangs up," that is, it ceases to rotate, air flow will continue to increase approximating curve 2 to the reject point c, at which time the red light will come on and the air flow will drop to its initial rate of flow.

To illustrate the sequence of events when a good bearing is being tested, upon pressing the start button, air flow will increase until it reaches some point, d, at which point the bearing starts to rotate. The bearing continues to rotate until it has satisfied the conditions established in the control unit for a good start. At this point, point e on curve 3, the air flow will be returned to its starting point, point f on curve 3, and will remain there until the bearing coasts to a stop at point g. At this point, g, a new cycle begins, repeating for as many times as required the preceding test cycle.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Ball bearing test apparatus comprising a test head including means for carrying a ball bearing to be tested including a rotor portion, fluid pressure means for rotating said rotor portion of said ball bearing carrying means, and electronic scanning means for initiating a signal controlled by movement of the rotor portion of said test head, a control means for initiating operation of said fluid pressure means and said electronic scanning means, a pulse amplifier for amplifying said signal, valve means responsive to said pulse amplifier signal for controlling operation of said fluid pressure means, and indicating means connected to said pulse amplifier for indicating the condition of the ball bearing tested.

2. A device of the class set forth in claim 1, wherein the indicating means connected to said pulse amplifier is controlled by a cycle counter preset to be actuated a predetermined number of times in response to the amplified signal.

3. A device as set forth in claim 1 wherein the indicating means is responsive to a cycle counter controlled by the signal, and said indicating means indicating a positive signal for an accept or reject condition of the ball bearing assembly under test.

4. Ball bearing test apparatus comprising a test head including means for carrying a ball bearing to be tested including a rotor portion, air pressure means including a nozzle for rotating said rotor portion of said ball bearing carrying means, and electronic scanning means for initiating a signal controlled by movement of the rotor portion of said test head, a control means for initiating operation of said air pressure means and said electronic scanning means, an amplifier for amplifying said signal, air valve means connected to said amplifier for controlling operation of said air pressure means, and means connected to said amplifier for indicating the condition of the ball bearing to be tested.

5. Ball bearing test apparatus comprising a test head including means for carrying a ball bearing to be tested including a rotor portion, pressure means for rotating said rotor portion of said ball bearing carrying means, and electronic scanning means for initiating a signal controlled by movement of the rotor portion of said test head, control means for initiating operation of said pressure means and said electronic scanning means, an amplifier for amplifying said signal, motorized valve means responsive to the amplifier signal for controlling operation of said pressure means, and indicating means connected to said amplifier for indicating the condition of the ball bearing under test.

6. A device of the class set forth in claim 5 wherein the motorized valve means responsive to said pulse amplifier for controlling operation of said pressure means maintains the pressure for rotating said motor constant during a predetermined portion of the operating cycle.

7. Ball bearing testing apparatus including fluid pressure means for providing relative movement between the inner and outer races of a ball bearing assembly, electronic scanning means actuated by said fluid pressure means for initiating a signal, a cycle counter, circuit means connected to said electronic scanning means for operating the cycle counter, and circuit means connected to said cycle counter for controlling the influence of the fluid pressure means and indicating the condition of the ball bearing assembly being tested.

8. A ball bearing testing apparatus as set forth in claim 7 and wherein the fluid pressure means includes a motorized air valve responsive to the particular signal received for providing a variable fluid pressure to give an indication of the condition of the ball bearing assembly being tested.

9. Ball bearing test apparatus comprising means for mounting a bearing to provide relative rotation between the races, means for rotating one of the bearing races relative to the other, means for providing pulse signals in response to relative rotation of the bearing races, a pulse counter connected to said pulse signal means, means controlled by the pulse counter for controlling operation of the bearing rotating means to stop rotation of the bearing after a predetermined number of pulses, a time delay device for controlling operation of the bearing rotating means to start another cycle of rotation of the bearing, a cycle counter connected to said pulse counter for determining the number of starts, and means responsive to the cycle counter for indicating the condition of the bearing.

10. Ball bearing test apparatus comprising means for mounting a bearing to provide relative rotation between the races, means for rotating one of the bearing races relative to the other, means for providing pulse signals in response to relative rotation of the bearing races, a pulse interval detector connected to said pulse signal means and limiting the torque exerted by said bearing rotating means, a pulse counter connected to said pulse signal means and controlling operation of the bearing rotating means to stop rotation of the bearing after a predetermined number of pulses, said pulse interval detector controlling operation of the bearing rotating means to start another cycle of rotation of the bearing, a cycle counter connected to said pulse counter for determining the number of starts, and means responsive to the cycle counter for indicating the condition of the bearing.

11. Ball bearing test apparatus comprising means for mounting a bearing to provide relative rotation between the races, means for rotating one of the bearing races relative to the other, means for providing pulse signals in response to relative rotation of the bearing races, a pulse interval detector connected to said pulse signal means and controlling operation of the bearing rotating means and permitting the torque exerted on the bearing to increase to a predetermined limit if the bearing is not operating properly, and means responsive to the bearing rotating means for indicating the condition of the bearing.

12. Ball bearing test apparatus comprising means for mounting a bearing to provide relative rotation between the races, means for rotating one of the bearing races relative to the other, means for providing pulse signals in response to relative rotation of the bearing races, a pulse interval detector connected to said pulse signal means and controlling operation of the bearing rotating means to limit the torque exerted on the bearing if the bearing is operating properly and permitting the torque exerted on the bearing to increase to a predetermined limit if the bearing is not operating properly, and means responsive to the bearing rotating means for indicating the condition of the bearing.

13. Ball bearing test apparatus comprising means for mounting a bearing to provide relative rotation between the races, fluid pressure means for rotating one of the bearing races relative to the other including a valve for controlling fluid flow, means for providing pulse signals in response to relative rotation of the bearing races, a pulse interval detector connected to said pulse signal means and controlling operation of said valve to limit pressure if the bearing is operating properly, a pulse counter connected to said pulse signal means and controlling operation of said valve to reduce the fluid pressure after a predetermined number of pulses is received by the pulse counter so that the bearing stops rotating, said pulse interval detector controlling operation of said valve to increase fluid pressure to start another cycle of rotation of the bearing, a cycle counter connected to said pulse counter for determining the number of starts, and means responsive to the cycle counter for indicating the condition of the bearing.

14. Ball bearing test apparatus comprising means for mounting a bearing to provide relative rotation between the races, means for rotating one of the bearing races relative to the other, means for providing pulse signals in response to relative rotation of the bearing races, a pulse interval detector connected to said pulse signal means and limiting the torque exerted by the bearing rotating means if the bearing is operating properly and permitting the torque exerted by the bearing rotating means to increase to a predetermined limit if the bearing is not operating properly, a pulse counter connected to said pulse signal means and controlling operation of said bearing rotating means to stop rotation of the bearing after a predetermined number of pulses if the bearing is operating properly, said pulse interval detector controlling operation of the bearing rotating means to start another cycle of rotation of the bearing if the bearing is operating properly, a cycle counter connected to said pulse counter for determining the number of starts, and means responsive to the cycle counter and to the bearing rotating means for indicating the condition of the bearing.

15. Ball bearing test apparatus comprising means for mounting a bearing to provide relative rotation between the races, means for rotating one of the bearing races relative to the other, means for providing pulse signals in response to relative rotation of the bearing races, a pulse interval detector connected to said pulse signal means and controlling operation of the bearing rotating means and permitting the torque exerted on the bearing to increase to a predetermined limit if the bearing is not operating properly, means responsive to the bearing rotating means for indicating a rejected bearing, said pulse interval detector limiting the torque exerted on the bearing below the predetermined limit if the bearing is operating properly, a pulse counter connected to said pulse signal means and controlling operation of said bearing rotating means to stop rotation of the bearing after a predetermined number of pulses if the bearing is operating properly, said pulse interval detector controlling operation of the bearing rotating means to start another cycle of operation of the bearing, a cycle counter connected to said pulse counter for determining the number of starts, and means responsive to the cycle counter for indicating an acceptable bearing.

References Cited in the file of this patent

UNITED STATES PATENTS

| | | |
|---|---|---|
| 2,427,364 | McKendry | Sept. 16, 1947 |
| 2,667,061 | Gibbs | Jan. 26, 1954 |
| 2,722,824 | Jensen et al. | Nov. 8, 1955 |
| 2,867,114 | Mims | Jan. 9, 1959 |

FOREIGN PATENTS

| | | |
|---|---|---|
| 401,733 | Italy | Jan. 29, 1943 |